W. H. COLES.
LAWN SPRINKLING DEVICE.
APPLICATION FILED AUG. 29, 1916.
1,349,874.
Patented Aug. 17, 1920.
2 SHEETS—SHEET 1.
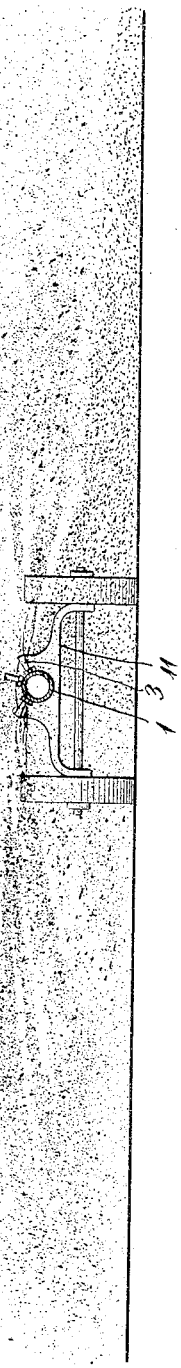
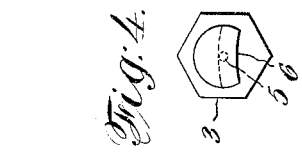
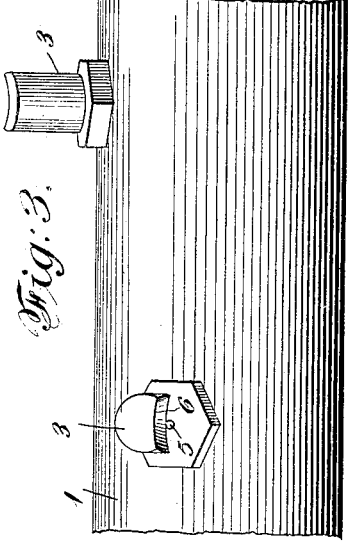
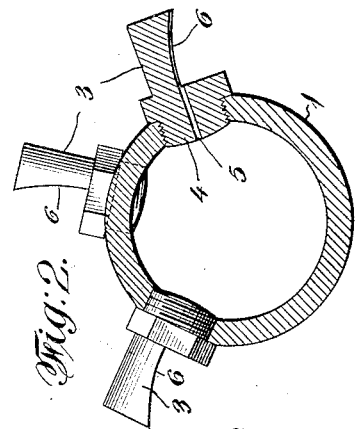
Inventor
Walter H Coles
By his Attorney

UNITED STATES PATENT OFFICE.

WALTER HAYS COLES, OF TROY, OHIO.

LAWN-SPRINKLING DEVICE.

1,349,874.      Specification of Letters Patent.     Patented Aug. 17, 1920.

Application filed August 29, 1916. Serial No. 117,401.

*To all whom it may concern:*

Be it known that I, WALTER H. COLES, a citizen of the United States, and a resident of the city of Troy, in the county of Miami and State of Ohio, have invented certain new and useful Improvements in Lawn-Sprinkling Devices, of which the following is a specification.

This invention relates to irrigating apparatus and particularly to lawn sprinkling devices, although it may be applied and used in any location and for any purpose for which it is adapted.

In apparatus of this general nature heretofore in use, it has been the practice to employ sprinkling devices that distributed water over comparatively small patches, usually circular in form, so that it was very difficult to so locate watered patches that their margins would conform to each other so as to uniformly sprinkle a lawn or other large area. Furthermore such devices as did not splash the water by means of whirling spray devices in comparatively large masses over the ground, projected the water in the form of a coarse spray of large particles which tends to pack the surface of the ground and thereby prevent percolation of the water into the ground.

An object of the invention is to overcome these disadvantages by providing a device by means of which water is uniformly supplied to comparatively large areas the margins of which can be readily made to conform to each other by moving the device about from place to place to uniformly water a given area.

Another object of the invention is to provide spray nozzles adapted to project liquid in the form of a fine mist-like spray, and to so group the nozzles that they coöperate to produce a single, formless cloud of mist to uniformly water the area supplied by the pipe.

The invention consists of the hereinafter described features of construction.

In the drawings in which like reference characters are employed to designate like parts.

Figure 1 is an end view of a device embodying the invention and showing the manner in which a group of nozzles distributes spray, the pipe itself being shown in cross section.

Fig. 2 is an enlarged cross section of the pipe taken through one of the nozzles.

Fig. 3 is a side elevation of a portion of the device showing a nozzle group.

Fig. 4 is a plan view of one of the nozzles.

Fig. 5 is a side elevation of a portion of the device showing the relative location of the nozzle groups and the manner in which they coöperate to uniformly distribute the spray.

In the drawings 1 represents a distributing pipe which may be of any convenient length and used singly or as one of several sections joined together by flexible hose connections to form a distributing pipe of any desired length. In order to effect a uniform distribution of the water from the pipe unit, the spray nozzles 3 are mounted in groups spaced apart at regular intervals along the upper side of the pipe as shown in Fig. 5 of the drawing.

The nozzles 3 are preferably adapted to project liquid in the form of a mist-like spray, the spray from each nozzle mingling with that from adjoining nozzles so as to uniformly moisten the area supplied by the pipe. In order to secure a uniform distribution of the spray over as extensive an area as possible laterally with relation to the pipe, the nozzles of each group are spaced apart transversely thereof. In order to prevent interference of the nozzles with each other, they are additionally arranged in a staggered or offset relation.

The nozzles are preferably arranged three in a group, the two lateral nozzles being set at such an angle to the vertical as to effect a maximum projection of their spray laterally with relation to the pipe. The center nozzle is arranged to project its cloud of spray vertically so as to substantially fill the space intermediate the spray-clouds produced by the end nozzles of the group. By this arrangement it will be seen that the three nozzles of each group coöperate to produce a cloud of spray of uniform density throughout and that will uniformly moisten a maximum area extending across the pipe at right angles thereto.

The specific construction of the nozzles is best shown in Fig. 2 of the drawing. It will be noted that the base portion 4 of the nozzle is threaded for engagement with a correspondingly threaded hole in the side of the pipe. Through the center of the base portion 4 extends a passage 5 of small diameter through which the water in the pipe finds an outlet. Extending outwardly from the base member 4 is a deflecting, or spray-producing member, 6, along the side of which the jet of water from the passage 5 flows. The jet engaging surfaces of the various nozzles are substantially radial to the axis of the pipe and are preferably given a slight curvature transversely and longitudinally in such a manner that the outer edge thereof overhangs the passage 5. This overhanging edge acts on the stream of water to break it up into a fine mist-like spray.

The configuration of the deflecting surface is such that the stream of water is changed from the circular form in which it emerges from the orifice 5 to a flat flame-shaped sheet of water which gradually diminishes to a point and finally breaks up into a fine mist. This effect can best be seen in Figs. 1 and 5 of the drawing wherein it will be noted that the water stream leaves the outer overhanging edge of the deflecting member in the form of a flat flame-shaped body which disintegrates into a fine mist at a point spaced only a short distance from the edge of the deflecting member.

The intervals separating the nozzle groups are preferably equal and of such value that the contiguous transverse margins of the areas sprayed by the different groups merge into each other, so that the area sprayed by the pipe unit as a whole, as well as the area sprayed by an individual group of nozzles, is uniformly continuous. As a result the combination of the lateral relative location of the nozzles of each group and the intervals between groups is such that a maximum area of ground about the pipe is uniformly supplied with moisture. By supporting the distributing pipe closely adjacent the ground, the retention of the spray in the fine mist-like form until it has reached the ground is insured, and the condensation of the minute water particles into larger objectionable drops, due to a greater distance of travel through the air, correspondingly prevented.

In order to facilitate the removal of the distributing pipe from place to place, the pipe is preferably provided with a low wheeled truck indicated at 11 by means of which it can be easily moved about as occasion requires. Trucks such as shown may be provided at both ends of each pipe, or at only one end in which case the other end may be supported on any suitable standard.

It will be apparent from the foregoing description that an irrigating apparatus has been provided that can be moved about from place to place to water comparatively large individual areas of such form that they readily coöperate to uniformly cover a given larger area. Moreover a construction and arrangement of nozzles has been provided that will produce a fine mist-like cloud of spray such as is best adapted for the purpose indicated.

What is claimed is:

An irrigating apparatus comprising: a horizontally disposed non-oscillating distributing pipe, two nozzles carried in the upper circumference of the pipe substantially equidistant from a vertical line passing through the center of the pipe, each nozzle having a channel and a deflecting surface overhanging said channel on which the issuing stream impinges, the deflecting surfaces of said two nozzles being arranged back to back and the direction of deflection of both nozzles being away from the vertical, and a third nozzle also having a channel and a deflecting surface overhanging the channel on which the issuing stream impinges, arranged intermediate the first two nozzles and inclined slightly with respect to the vertical center line of pipe, the direction of deflection being opposite to that of the inclination of said third nozzle.

Signed at Troy, in the county of Miami and State of Ohio, this 25th day of August A. D. 1916.

WALTER HAYS COLES.